United States Patent
Bedingfield, Sr. et al.

(10) Patent No.: US 7,403,768 B2
(45) Date of Patent: Jul. 22, 2008

(54) METHOD FOR USING AIN TO DELIVER CALLER ID TO TEXT/ALPHA-NUMERIC PAGERS AS WELL AS OTHER WIRELESS DEVICES, FOR CALLS DELIVERED TO WIRELESS NETWORK

(75) Inventors: James C. Bedingfield, Sr., Lilburn, GA (US); David A. Levine, Atlanta, GA (US); Anita Simpson, Decatur, GA (US)

(73) Assignee: AT&T Delaware Intellectual Property, Inc., Wilmington, DE (US)

( * ) Notice: Subject to any disclaimer, the term of this patent is extended or adjusted under 35 U.S.C. 154(b) by 432 days.

(21) Appl. No.: 10/174,566

(22) Filed: Jun. 18, 2002

(65) Prior Publication Data

US 2004/0248560 A1 Dec. 9, 2004

Related U.S. Application Data

(60) Provisional application No. 60/312,138, filed on Aug. 14, 2001.

(51) Int. Cl.
*H04M 3/42* (2006.01)
*H04Q 7/22* (2006.01)
*H04Q 7/38* (2006.01)

(52) U.S. Cl. .............. 455/414.1; 455/412.1; 455/412.2; 455/413; 455/414.2; 455/414.3; 455/414.4; 455/415; 455/417; 455/418; 455/419

(58) Field of Classification Search .............. 455/412.1, 455/412.2, 413, 414.1, 414.2, 414.3, 414.4, 455/415, 417, 418, 419
See application file for complete search history.

(56) References Cited

U.S. PATENT DOCUMENTS 4,266,098 A 5/1981 Novak (Continued)

FOREIGN PATENT DOCUMENTS

EP 0 821 511 A2 1/1998

(Continued)

OTHER PUBLICATIONS

Talking Caller ID, Smarthome, http://www.smarthome.com/5154.html Nov. 5, 2001.

(Continued)

*Primary Examiner*—Duc Nguyen
*Assistant Examiner*—Matthew W Genack
(74) *Attorney, Agent, or Firm*—Cantor Colburn LLP

(57) ABSTRACT

A remote call notification system for incoming calls to a wireless telecommunications device. The system includes a switch, a service control point, an intelligent server, a monitoring module, and a wireless terminating trigger used on a mobile switching center. All components are in communication with each other. The remote call notification is transmitted to a remote communication device such as a PC, an interactive pager, and a mobile phone. The call notification includes a calling number, the name of a calling party, time and date identifiers, status identifiers that provides a real-time status of the incoming communication, a disposition identifier, and a priority identifier. A remote call notification method including detecting an incoming communication to a subscriber's wireless communication device, creating a remote call notification, assigning an access address associated with a remote communication device, and forwarding the remote call notification to the remote communication device.

21 Claims, 3 Drawing Sheets

U.S. PATENT DOCUMENTS

| | | | |
|---|---|---|---|
| 4,268,722 A | 5/1981 | Little et al. | |
| 4,277,649 A | 7/1981 | Sheinbein | |
| 4,582,956 A | 4/1986 | Doughty | |
| 4,649,433 A | 3/1987 | Verhoeven | |
| 4,649,533 A | 3/1987 | Chorley et al. | |
| 4,663,777 A | 5/1987 | Szeto | |
| 4,698,839 A | 10/1987 | DeVaney et al. | |
| 4,791,664 A | 12/1988 | Lutz et al. | |
| 4,797,911 A * | 1/1989 | Szlam et al. | 379/88.22 |
| 4,802,202 A | 1/1989 | Takahashi et al. | |
| 4,817,133 A | 3/1989 | Takahashi et al. | |
| 4,823,304 A * | 4/1989 | Frantz et al. | 709/232 |
| 4,845,743 A | 7/1989 | Lutz | |
| 4,850,013 A | 7/1989 | Rose | |
| 4,995,075 A | 2/1991 | Angiolillo-Bent | |
| 5,029,196 A | 7/1991 | Morganstein | |
| 5,109,405 A | 4/1992 | Morganstein | |
| 5,121,423 A | 6/1992 | Morihiro et al. | |
| 5,151,929 A | 9/1992 | Wolf | |
| 5,157,712 A | 10/1992 | Wallen, Jr. | |
| 5,161,181 A | 11/1992 | Zwick | |
| 5,200,994 A | 4/1993 | Sasano et al. | |
| 5,206,901 A | 4/1993 | Harlow | |
| D338,889 S | 8/1993 | Fuqua | |
| 5,260,987 A | 11/1993 | Mauger | |
| 5,263,084 A | 11/1993 | Chaput et al. | |
| 5,265,145 A | 11/1993 | Lim | |
| 5,274,699 A | 12/1993 | Ranz | |
| 5,278,894 A | 1/1994 | Shaw | |
| 5,289,542 A | 2/1994 | Kessler | |
| 5,315,650 A | 5/1994 | Smith et al. | |
| 5,329,578 A | 7/1994 | Brennan et al. | |
| 5,333,152 A | 7/1994 | Wilber | |
| 5,338,889 A | 8/1994 | Vora et al. | |
| 5,341,411 A | 8/1994 | Hashimoto | |
| 5,347,574 A | 9/1994 | Morganstein | |
| 5,361,295 A | 11/1994 | Solomon et al. | |
| 5,383,466 A | 1/1995 | Partika | |
| 5,386,460 A | 1/1995 | Boakes et al. | |
| 5,388,150 A | 2/1995 | Schneyer et al. | |
| 5,413,605 A | 5/1995 | Ashby et al. | |
| 5,420,910 A | 5/1995 | Rudokas et al. | |
| 5,420,914 A | 5/1995 | Blumhardt | |
| 5,420,920 A | 5/1995 | Capper et al. | |
| 5,425,076 A | 6/1995 | Knippelmier | |
| 5,425,089 A | 6/1995 | Chan et al. | |
| 5,430,719 A | 7/1995 | Weisser, Jr. | 370/58.2 |
| 5,446,785 A | 8/1995 | Hirai | |
| 5,452,089 A | 9/1995 | Bushman | |
| 5,452,346 A | 9/1995 | Miyamoto | |
| 5,459,779 A | 10/1995 | Backaus et al. | |
| 5,466,785 A | 11/1995 | De Framond | |
| 5,467,388 A | 11/1995 | Redd, Jr. et al. | |
| 5,475,748 A | 12/1995 | Jones | |
| 5,481,594 A | 1/1996 | Shen et al. | |
| 5,481,599 A | 1/1996 | MacAllister et al. | |
| 5,481,602 A | 1/1996 | Griffiths et al. | |
| 5,490,205 A | 2/1996 | Kondo et al. | |
| 5,497,414 A | 3/1996 | Bartholomew | |
| 5,502,762 A | 3/1996 | Andrew | |
| 5,506,893 A * | 4/1996 | Buscher et al. | 379/115.02 |
| 5,511,111 A | 4/1996 | Serbetcioglu et al. | |
| 5,530,741 A | 6/1996 | Rubin | |
| 5,533,106 A | 7/1996 | Blumhardt | |
| 5,535,265 A | 7/1996 | Suwandhaputra | |
| 5,546,447 A | 8/1996 | Skarbo et al. | |
| 5,550,900 A | 8/1996 | Ensor et al. | |
| 5,550,905 A | 8/1996 | Silverman | |
| 5,563,935 A | 10/1996 | Small | |
| 5,563,936 A | 10/1996 | Washington | |
| 5,602,908 A | 2/1997 | Fan | |
| 5,608,788 A | 3/1997 | Demlow et al. | |
| 5,619,561 A | 4/1997 | Reese | |
| 5,631,950 A | 5/1997 | Brown | |
| 5,636,269 A | 6/1997 | Eisdorfer | |
| 5,644,629 A | 7/1997 | Chow | |
| 5,646,979 A | 7/1997 | Knuth | |
| 5,657,372 A | 8/1997 | Ahlberg et al. | |
| D383,466 S | 9/1997 | Burrell et al. | |
| 5,668,852 A | 9/1997 | Holmes | |
| 5,696,809 A | 12/1997 | Voit | |
| 5,696,815 A | 12/1997 | Smyk | |
| 5,699,413 A | 12/1997 | Sridhar | |
| 5,699,523 A * | 12/1997 | Li et al. | 709/238 |
| 5,701,301 A | 12/1997 | Weisser, Jr. | |
| 5,703,934 A * | 12/1997 | Zicker et al. | 455/462 |
| 5,724,412 A | 3/1998 | Srinivasan | |
| 5,734,706 A | 3/1998 | Windsor et al. | |
| 5,742,668 A | 4/1998 | Pepe et al. | |
| 5,754,635 A | 5/1998 | Kim | |
| 5,754,636 A | 5/1998 | Bayless et al. | |
| 5,754,775 A | 5/1998 | Adamson et al. | |
| 5,771,281 A | 6/1998 | Batten, Jr. | |
| 5,771,283 A | 6/1998 | Chang et al. | |
| 5,781,621 A | 7/1998 | Lim et al. | |
| 5,784,444 A | 7/1998 | Snyder et al. | |
| 5,796,806 A | 8/1998 | Birckbichler | |
| 5,799,072 A | 8/1998 | Vulcan | |
| 5,802,160 A | 9/1998 | Kugell | |
| 5,802,251 A | 9/1998 | Cohen et al. | |
| 5,805,587 A | 9/1998 | Norris et al. | |
| 5,805,682 A | 9/1998 | Voit et al. | |
| 5,805,997 A | 9/1998 | Farris | |
| 5,809,128 A | 9/1998 | McMullin | |
| 5,812,533 A | 9/1998 | Cox et al. | |
| 5,812,649 A | 9/1998 | Shen | |
| 5,838,774 A | 11/1998 | Weisser, Jr. | |
| 5,841,838 A | 11/1998 | Itoh et al. | |
| 5,841,850 A | 11/1998 | Fan | |
| 5,848,142 A | 12/1998 | Yaker | |
| 5,850,435 A | 12/1998 | Devillier | |
| 5,850,436 A | 12/1998 | Rosen et al. | |
| 5,857,017 A | 1/1999 | Ohi | |
| 5,859,903 A | 1/1999 | Lee | |
| 5,872,834 A | 2/1999 | Teitelbaum | |
| 5,872,934 A | 2/1999 | Whitehouse et al. | |
| 5,878,036 A | 3/1999 | Spratz et al. | |
| 5,883,942 A | 3/1999 | Lim et al. | |
| 5,884,144 A | 3/1999 | Chavz et al. | |
| 5,894,504 A | 4/1999 | Alfred et al. | |
| 5,901,209 A | 5/1999 | Tannenbaum et al. | |
| 5,901,212 A | 5/1999 | True et al. | |
| 5,903,636 A | 5/1999 | Malik | |
| 5,905,794 A | 5/1999 | Gunn et al. | |
| 5,907,596 A | 5/1999 | Karnowski | |
| 5,907,604 A | 5/1999 | Hsu | |
| 5,915,000 A | 6/1999 | Nguyen et al. | |
| 5,917,817 A | 6/1999 | Dunn et al. | 370/352 |
| 5,923,744 A | 7/1999 | Cheng | |
| 5,930,701 A | 7/1999 | Skog | |
| 5,940,484 A | 8/1999 | DeFazio et al. | |
| 5,943,416 A | 8/1999 | Gisby | |
| 5,946,363 A | 8/1999 | Rominger et al. | |
| 5,946,636 A | 8/1999 | Uyeno et al. | |
| 5,946,684 A | 8/1999 | Lund | |
| D413,605 S | 9/1999 | Thomas | |
| 5,948,040 A | 9/1999 | DeLorme et al. | |
| 5,948,061 A | 9/1999 | Merriman et al. | |
| 5,949,865 A | 9/1999 | Fusinato | |
| 5,953,399 A | 9/1999 | Farris et al. | |
| 5,953,657 A | 9/1999 | Ghisler | |
| 5,963,626 A | 10/1999 | Nabkel | |
| 5,969,647 A | 10/1999 | Mou et al. | |
| 5,970,127 A | 10/1999 | Smith et al. | |

| | | | |
|---|---|---|---|
| 5,970,128 A | 10/1999 | Kim | |
| 5,974,309 A | 10/1999 | Foti | |
| 5,982,866 A | 11/1999 | Kowalski | |
| 5,991,377 A | 11/1999 | Malik | |
| 5,999,207 A | 12/1999 | Rodriguez et al. | |
| 5,999,599 A | 12/1999 | Shaffer et al. | |
| 5,999,613 A | 12/1999 | Nabkel et al. | |
| 6,006,087 A | 12/1999 | Amin | 455/413 |
| 6,009,321 A | 12/1999 | Wang et al. | |
| 6,014,559 A | 1/2000 | Amin | 455/413 |
| 6,016,512 A | 1/2000 | Huitema | |
| 6,021,188 A | 2/2000 | Meg | |
| 6,021,427 A * | 2/2000 | Spagna et al. | 709/206 |
| 6,031,899 A | 2/2000 | Wu | |
| 6,044,148 A | 3/2000 | Bleile | |
| 6,049,291 A | 4/2000 | Kikinis | |
| 6,058,171 A | 5/2000 | Hoopes | |
| 6,061,434 A | 5/2000 | Corbett | |
| 6,061,566 A | 5/2000 | Friman | |
| 6,064,876 A | 5/2000 | Ishida | |
| 6,065,844 A | 5/2000 | Chen | |
| 6,072,859 A | 6/2000 | King | |
| 6,078,581 A | 6/2000 | Shtivelman et al. | |
| 6,091,947 A | 7/2000 | Sumner | 455/413 |
| 6,094,478 A | 7/2000 | Shepherd et al. | |
| 6,094,573 A | 7/2000 | Heinonen et al. | |
| 6,094,574 A | 7/2000 | Vance et al. | |
| 6,094,575 A | 7/2000 | Anderson et al. | |
| 6,101,246 A | 8/2000 | Heinmiller et al. | |
| 6,104,784 A | 8/2000 | Robbins | |
| 6,104,800 A | 8/2000 | Benson | |
| 6,108,630 A | 8/2000 | Kuechler et al. | |
| 6,111,939 A | 8/2000 | Brabanec | |
| 6,134,235 A | 10/2000 | Goldman et al. | |
| 6,134,311 A | 10/2000 | Ekstrom | |
| 6,137,870 A | 10/2000 | Scherer | |
| 6,137,871 A | 10/2000 | Maier et al. | |
| 6,141,341 A | 10/2000 | Jones | |
| 6,141,409 A | 10/2000 | Madoch et al. | |
| 6,144,644 A | 11/2000 | Bajzath et al. | |
| 6,154,531 A | 11/2000 | Clapper | |
| 6,160,876 A | 12/2000 | Moss et al. | |
| 6,161,021 A | 12/2000 | Akpa | |
| 6,163,595 A | 12/2000 | Parker et al. | |
| 6,163,691 A | 12/2000 | Buettner et al. | |
| 6,167,254 A | 12/2000 | Chavez, Jr. et al. | 455/412 |
| 6,169,911 B1 | 1/2001 | Wagner et al. | |
| 6,173,049 B1 | 1/2001 | Malik | |
| 6,178,232 B1 | 1/2001 | Latter et al. | |
| 6,181,928 B1 | 1/2001 | Moon | 455/415 |
| D437,879 S | 2/2001 | Weinandt | |
| 6,185,289 B1 | 2/2001 | Hetz et al. | |
| 6,192,115 B1 | 2/2001 | Toy et al. | |
| 6,192,116 B1 | 2/2001 | Mayak | |
| 6,198,480 B1 * | 3/2001 | Cotugno et al. | 715/866 |
| 6,198,920 B1 | 3/2001 | Doviak et al. | |
| 6,202,023 B1 | 3/2001 | Hancock et al. | |
| 6,219,407 B1 | 4/2001 | Kanevsky et al. | |
| 6,222,826 B1 | 4/2001 | Faynberg et al. | |
| 6,226,367 B1 | 5/2001 | Smith et al. | |
| 6,226,369 B1 | 5/2001 | Lim et al. | |
| 6,226,399 B1 | 5/2001 | Robinson | |
| 6,230,006 B1 | 5/2001 | Keenan et al. | |
| 6,233,325 B1 | 5/2001 | Frech et al. | |
| 6,236,975 B1 | 5/2001 | Boe et al. | |
| 6,243,448 B1 | 6/2001 | Corbett et al. | |
| 6,243,461 B1 | 6/2001 | Hwang | |
| 6,252,952 B1 | 6/2001 | Kung et al. | |
| 6,256,671 B1 | 7/2001 | Strentzsch et al. | |
| 6,262,987 B1 | 7/2001 | Mogul | |
| 6,266,399 B1 | 7/2001 | Weller et al. | |
| 6,278,704 B1 | 8/2001 | Creamer et al. | |
| 6,278,862 B1 | 8/2001 | Henderson | |
| 6,282,275 B1 | 8/2001 | Gurbani et al. | |
| 6,292,479 B1 | 9/2001 | Bartholomew et al. | |
| 6,292,549 B1 | 9/2001 | Lung et al. | |
| 6,295,502 B1 | 9/2001 | Hancock et al. | |
| 6,301,342 B1 | 10/2001 | Ander et al. | |
| 6,301,350 B1 | 10/2001 | Henningson et al. | |
| 6,304,644 B2 | 10/2001 | Karnowski | |
| 6,310,943 B1 | 10/2001 | Kowalski | |
| 6,311,057 B1 | 10/2001 | Barvesten | |
| 6,317,488 B1 | 11/2001 | DePond et al. | |
| 6,317,781 B1 | 11/2001 | DeBoor et al. | |
| 6,324,263 B1 | 11/2001 | Sherwood et al. | |
| 6,324,271 B1 | 11/2001 | Sawyer et al. | |
| 6,327,347 B1 | 12/2001 | Gutzmann | |
| 6,332,021 B2 | 12/2001 | Latter et al. | |
| 6,333,973 B1 | 12/2001 | Smith et al. | |
| 6,337,979 B1 | 1/2002 | Nakayasu | |
| 6,339,639 B1 | 1/2002 | Henderson | |
| 6,341,161 B1 | 1/2002 | Latter et al. | |
| 6,345,187 B1 | 2/2002 | Berthoud et al. | |
| 6,347,136 B1 | 2/2002 | Horan | |
| 6,351,637 B1 | 2/2002 | Lee | |
| 6,353,664 B1 | 3/2002 | Cannon et al. | |
| 6,361,637 B2 | 3/2002 | Martin et al. | |
| 6,363,140 B1 | 3/2002 | Pinard | |
| 6,363,411 B1 | 3/2002 | Dugan et al. | |
| 6,363,664 B1 | 4/2002 | Brutsaert | |
| 6,366,661 B1 | 4/2002 | Devillier et al. | |
| 6,366,772 B1 | 4/2002 | Arnson | |
| 6,377,807 B1 | 4/2002 | Iparrea et al. | |
| 6,377,979 B1 | 4/2002 | Yamashita | |
| 6,389,124 B1 | 5/2002 | Schnarel et al. | |
| 6,400,809 B1 | 6/2002 | Bossemeyer, Jr. et al. | |
| 6,400,947 B1 | 6/2002 | Bright et al. | |
| 6,404,868 B1 | 6/2002 | Beamish et al. | |
| 6,404,875 B2 | 6/2002 | Malik et al. | |
| 6,411,692 B1 | 6/2002 | Scherer | |
| 6,421,425 B1 | 7/2002 | Bossi et al. | |
| 6,422,263 B1 | 7/2002 | Spicer | |
| 6,427,003 B1 | 7/2002 | Corbett et al. | |
| 6,427,064 B1 | 7/2002 | Henderson | |
| 6,434,394 B1 | 8/2002 | Grundvig et al. | |
| 6,437,879 B1 | 8/2002 | Temple | |
| 6,438,216 B1 | 8/2002 | Aktas | |
| 6,438,217 B1 | 8/2002 | Huna | |
| 6,438,584 B1 | 8/2002 | Powers | |
| 6,442,249 B1 | 8/2002 | Miller, Jr. | |
| 6,442,262 B1 | 8/2002 | Moss et al. | |
| 6,442,263 B1 | 8/2002 | Beaton et al. | |
| 6,442,283 B1 | 8/2002 | Tewfik et al. | |
| 6,445,781 B1 | 9/2002 | Heinmiller et al. | |
| 6,449,351 B1 | 9/2002 | Moss et al. | |
| 6,449,361 B1 | 9/2002 | Okuda | |
| 6,462,646 B2 | 10/2002 | Helferich | |
| 6,466,653 B1 | 10/2002 | Hamrick et al. | |
| 6,477,246 B1 | 11/2002 | Dolan et al. | |
| 6,480,589 B1 | 11/2002 | Lee et al. | |
| 6,483,898 B2 | 11/2002 | Lew et al. | |
| 6,493,430 B2 | 12/2002 | Leuca et al. | |
| 6,493,431 B1 | 12/2002 | Troen-Krasnow et al. | |
| 6,493,437 B1 | 12/2002 | Olshansky | |
| 6,493,439 B2 | 12/2002 | Lung et al. | |
| 6,494,953 B2 | 12/2002 | Hayes et al. | |
| 6,496,569 B2 | 12/2002 | Pelletier et al. | |
| 6,496,571 B1 | 12/2002 | Wilson | |
| 6,496,692 B1 | 12/2002 | Shanahan | |
| 6,498,841 B2 | 12/2002 | Bull et al. | |
| 6,507,737 B1 | 1/2003 | Laham et al. | |
| 6,529,500 B1 | 3/2003 | Pandharipande | |
| 6,529,591 B1 | 3/2003 | Dosani et al. | |
| 6,532,490 B1 | 3/2003 | Lewis et al. | |
| 6,539,080 B1 | 3/2003 | Bruce et al. | |
| 6,542,583 B1 | 4/2003 | Taylor | |

| | | | | | | |
|---|---|---|---|---|---|---|
| 6,542,586 | B1 | 4/2003 | Helstab | 6,818,474 | B2 | 11/2004 | Kim et al. |
| 6,542,591 | B1 | 4/2003 | Amro et al. | 6,826,271 | B2 | 11/2004 | Kanabar et al. |
| 6,542,602 | B1 | 4/2003 | Elazar | 6,826,617 | B1 | 11/2004 | Ansell et al. |
| 6,542,812 | B1 | 4/2003 | Obradovich et al. | 6,830,595 | B2 | 12/2004 | Reynolds, III |
| 6,546,092 | B2 | 4/2003 | Corbett et al. | 6,831,974 | B1 | 12/2004 | Watson et al. |
| 6,549,621 | B1 | 4/2003 | Christie et al. | 6,842,512 | B2 | 1/2005 | Pedersen |
| 6,553,110 | B1 | 4/2003 | Peng | 6,845,151 | B2 | 1/2005 | Peng |
| 6,553,221 | B2 | 4/2003 | Nakamura | 6,845,512 | B2 | 1/2005 | Horng et al. |
| 6,556,540 | B1 * | 4/2003 | Mawhinney et al. ........ 370/229 | 6,853,710 | B2 | 2/2005 | Harris |
| 6,560,317 | B1 | 5/2003 | Quagliana | 6,853,711 | B2 | 2/2005 | Brisebois et al. |
| 6,560,327 | B1 | 5/2003 | McConnell | 6,856,677 | B2 | 2/2005 | Leijonhufvud |
| 6,566,995 | B2 | 5/2003 | Furuuchi et al. | 6,859,527 | B1 | 2/2005 | Banks et al. |
| 6,570,971 | B2 | 5/2003 | Latter et al. | 6,865,266 | B1 | 3/2005 | Peshan |
| 6,570,974 | B1 | 5/2003 | Gerzberg et al. | 6,865,384 | B2 | 3/2005 | Sagi et al. |
| 6,574,319 | B2 | 6/2003 | Latter et al. | 6,868,155 | B1 | 3/2005 | Cannon et al. |
| 6,584,490 | B1 * | 6/2003 | Schuster et al. ............. 709/200 | 6,871,076 | B2 | 3/2005 | Samn |
| 6,587,458 | B1 | 7/2003 | Burg et al. | 6,888,927 | B1 | 5/2005 | Cruickshank et al. |
| 6,590,970 | B1 | 7/2003 | Cai et al. | 6,888,972 | B2 | 5/2005 | Berg et al. |
| 6,597,905 | B1 | 7/2003 | Hijii | 6,891,940 | B1 * | 5/2005 | Bhandari et al. ........ 379/142.06 |
| 6,603,840 | B2 | 8/2003 | Fellingham et al. | 6,898,275 | B2 | 5/2005 | Dolan et al. |
| 6,608,891 | B1 | 8/2003 | Pelletier et al. | 6,904,276 | B1 * | 6/2005 | Freeman et al. ............. 455/406 |
| 6,618,474 | B1 | 9/2003 | Reese | 6,907,034 | B1 | 6/2005 | Begis |
| 6,625,595 | B1 | 9/2003 | Anderson et al. | 6,909,777 | B2 | 6/2005 | Latter et al. |
| 6,631,181 | B1 | 10/2003 | Bates et al. | 6,914,953 | B2 | 7/2005 | Boerstler |
| 6,633,633 | B1 | 10/2003 | Bedingfield | 6,922,411 | B1 | 7/2005 | Taylor |
| 6,639,979 | B1 | 10/2003 | Kim | 6,928,154 | B1 | 8/2005 | Cheaito et al. |
| 6,650,743 | B2 | 11/2003 | Heinmiller et al. | 6,931,007 | B2 | 8/2005 | Jones |
| 6,659,597 | B2 | 12/2003 | Murata et al. | 6,947,531 | B1 | 9/2005 | Lewis et al. |
| 6,661,785 | B1 | 12/2003 | Zhang et al. | 6,952,469 | B2 | 10/2005 | Han |
| 6,665,388 | B2 | 12/2003 | Bedingfield | 6,977,993 | B2 | 12/2005 | Starbuck et al. |
| 6,665,715 | B1 | 12/2003 | Houri | 6,996,211 | B2 | 2/2006 | Reynolds et al. |
| 6,683,870 | B1 | 1/2004 | Archer | 7,016,482 | B2 | 3/2006 | Moss et al. |
| 6,687,341 | B1 | 2/2004 | Koch et al. | 7,027,408 | B2 | 4/2006 | Nabkel et al. |
| 6,697,357 | B2 | 2/2004 | Emerson, III | 7,027,569 | B2 | 4/2006 | Price |
| 6,701,160 | B1 | 3/2004 | Pinder et al. | 7,085,578 | B2 | 8/2006 | Barclay et al. |
| 6,718,021 | B2 | 4/2004 | Crockett et al. | 7,097,169 | B2 | 8/2006 | Mueller |
| 6,721,407 | B1 | 4/2004 | Michelena | 7,103,167 | B2 | 9/2006 | Brahm et al. |
| 6,724,872 | B1 | 4/2004 | Moore et al. | 7,103,662 | B2 | 9/2006 | Ray et al. |
| 6,725,872 | B2 | 4/2004 | Kindell et al. | 7,139,374 | B1 | 11/2006 | Scott et al. |
| 6,728,355 | B2 | 4/2004 | Kowalski | 7,155,211 | B2 | 12/2006 | Mun et al. |
| 6,728,360 | B1 | 4/2004 | Brennan | 7,184,533 | B1 | 2/2007 | Shaffer et al. |
| 6,728,365 | B1 | 4/2004 | Li et al. | 7,228,129 | B1 | 6/2007 | Ward et al. |
| 6,731,727 | B2 | 5/2004 | Corbett et al. | 2001/0002209 | A1 | 5/2001 | Han |
| 6,732,188 | B1 | 5/2004 | Flockhart et al. | 2001/0005854 | A1 | 6/2001 | Murata et al. |
| 6,738,615 | B1 * | 5/2004 | Chow et al. .................. 455/415 | 2001/0036174 | A1 | 11/2001 | Herring |
| 6,748,058 | B1 | 6/2004 | Schwend et al. | 2001/0044898 | A1 | 11/2001 | Benussi et al. |
| 6,748,068 | B1 | 6/2004 | Walsh et al. | 2001/0048737 | A1 | 12/2001 | Goldberg et al. |
| 6,751,457 | B1 | 6/2004 | Martin | 2002/0004382 | A1 | 1/2002 | Cox et al. |
| 6,757,274 | B1 | 6/2004 | Bedingfield et al. | 2002/0009184 | A1 | 1/2002 | Shnier |
| 6,757,740 | B1 | 6/2004 | Parekh et al. | 2002/0016748 | A1 | 2/2002 | Emodi |
| 6,760,413 | B2 | 7/2004 | Cannon et al. | 2002/0041605 | A1 | 4/2002 | Benussi et al. |
| 6,765,998 | B2 | 7/2004 | Bruce et al. | 2002/0055926 | A1 | 5/2002 | Dan et al. |
| 6,766,003 | B2 | 7/2004 | Moss et al. | 2002/0067816 | A1 | 6/2002 | Bushnell |
| 6,768,792 | B2 | 7/2004 | Brown et al. | 2002/0077102 | A1 | 6/2002 | Achuthan et al. |
| D494,953 | S | 8/2004 | Leung | 2002/0082050 | A1 | 6/2002 | Mountney et al. |
| 6,771,754 | B2 | 8/2004 | Pelletier et al. | 2002/0085687 | A1 | 7/2002 | Contractor et al. |
| 6,771,755 | B1 | 8/2004 | Simpson | 2002/0090933 | A1 * | 7/2002 | Rouse et al. ................. 455/412 |
| 6,771,956 | B1 | 8/2004 | Beeler | 2002/0094826 | A1 | 7/2002 | Lee |
| 6,775,366 | B1 | 8/2004 | Cobbett et al. | 2002/0118812 | A1 | 8/2002 | Contractor |
| 6,775,540 | B2 | 8/2004 | Iyer | 2002/0119430 | A1 | 8/2002 | Szynalski |
| 6,778,524 | B1 | 8/2004 | Augart | 2002/0120629 | A1 | 8/2002 | Leonard |
| 6,779,020 | B1 | 8/2004 | Henrick | 2002/0122401 | A1 | 9/2002 | Xiang et al. |
| 6,785,301 | B1 | 8/2004 | Chapman et al. | 2002/0125929 | A1 | 9/2002 | Chen et al. |
| 6,785,368 | B1 | 8/2004 | Eason et al. | 2002/0183098 | A1 | 12/2002 | Lee |
| 6,785,540 | B1 | 8/2004 | Wichelman | 2002/0188443 | A1 * | 12/2002 | Reddy et al. ................. 704/231 |
| 6,792,266 | B1 | 9/2004 | Masuda et al. | 2002/0191755 | A1 | 12/2002 | Lew |
| 6,798,841 | B2 | 9/2004 | Hansen | 2002/0196913 | A1 | 12/2002 | Ruckart |
| 6,798,879 | B1 | 9/2004 | Beham | 2002/0196914 | A1 | 12/2002 | Ruckart |
| 6,807,267 | B2 | 10/2004 | Moss et al. | 2002/0197991 | A1 | 12/2002 | Anvekar et al. |
| 6,810,077 | B1 | 10/2004 | Dezzono | 2003/0007620 | A1 | 1/2003 | Elsey |
| 6,810,115 | B2 | 10/2004 | Fukuda | 2003/0012147 | A1 | 1/2003 | Buckman et al. |
| 6,813,344 | B1 | 11/2004 | Lemke | 2003/0012353 | A1 | 1/2003 | Tang |
| 6,816,481 | B1 | 11/2004 | Adams et al. | 2003/0016800 | A1 | 1/2003 | Fukuda |

| | | | |
|---|---|---|---|
| 2003/0021290 A1 | 1/2003 | Jones | |
| 2003/0026413 A1* | 2/2003 | Brandt et al. | 379/230 |
| 2003/0026416 A1 | 2/2003 | Fusco | |
| 2003/0032414 A1 | 2/2003 | Melaku | |
| 2003/0050100 A1 | 3/2003 | Dent | |
| 2003/0053602 A1 | 3/2003 | Stuckman et al. | |
| 2003/0063730 A1 | 4/2003 | Woodring | |
| 2003/0063731 A1 | 4/2003 | Woodring | |
| 2003/0068020 A1 | 4/2003 | Hamrick et al. | |
| 2003/0092384 A1 | 5/2003 | Ross, III | |
| 2003/0092432 A1 | 5/2003 | Hwang | |
| 2003/0095650 A1 | 5/2003 | Mize | |
| 2003/0108184 A1 | 6/2003 | Brown et al. | |
| 2003/0112938 A1 | 6/2003 | Kanakubo et al. | |
| 2003/0119503 A1 | 6/2003 | Shohara et al. | |
| 2003/0133553 A1 | 7/2003 | Khakoo | |
| 2003/0133653 A1 | 7/2003 | De Barros et al. | |
| 2003/0135562 A1 | 7/2003 | Himmel et al. | |
| 2003/0148758 A1 | 8/2003 | McMullin | |
| 2003/0152207 A1 | 8/2003 | Ryan | |
| 2003/0172183 A1 | 9/2003 | Anderson et al. | |
| 2003/0187949 A1 | 10/2003 | Bhatt | |
| 2003/0196206 A1 | 10/2003 | Shusman | |
| 2003/0198322 A1 | 10/2003 | White, Jr. | |
| 2003/0219107 A1 | 11/2003 | Richardson et al. | |
| 2004/0049545 A1 | 3/2004 | Lockridge et al. | |
| 2004/0101118 A1 | 5/2004 | Powell | |
| 2004/0101124 A1 | 5/2004 | Koch et al. | |
| 2004/0109558 A1 | 6/2004 | Koch | |
| 2004/0114730 A1 | 6/2004 | Koch et al. | |
| 2004/0120475 A1 | 6/2004 | Bauer et al. | |
| 2004/0125929 A1 | 7/2004 | Pope | |
| 2004/0171370 A1 | 9/2004 | Natarajan | |
| 2004/0181587 A1 | 9/2004 | Cao et al. | |
| 2004/0202298 A1 | 10/2004 | Lopez et al. | |
| 2004/0202299 A1 | 10/2004 | Schwartz | |
| 2004/0208301 A1 | 10/2004 | Urban et al. | |
| 2004/0208302 A1 | 10/2004 | Urban et al. | |
| 2004/0209604 A1 | 10/2004 | Urban et al. | |
| 2004/0209605 A1 | 10/2004 | Urban et al. | |
| 2004/0209640 A1 | 10/2004 | Urban et al. | |
| 2004/0233892 A1 | 11/2004 | Roberts et al. | |
| 2004/0242212 A1 | 12/2004 | Bacon et al. | |
| 2004/0248560 A1 | 12/2004 | Bedingfield et al. | |
| 2005/0084084 A1 | 4/2005 | Cook et al. | |
| 2005/0100158 A1 | 5/2005 | Kreiner et al. | |
| 2005/0107074 A1 | 5/2005 | Zellner | |
| 2005/0147228 A1 | 7/2005 | Perrella et al. | |
| 2005/0152525 A1 | 7/2005 | Kent, Jr. et al. | |
| 2006/0002540 A1 | 1/2006 | Kreiner et al. | |
| 2006/0013375 A1 | 1/2006 | Smith et al. | |
| 2006/0029209 A1 | 2/2006 | Moton et al. | |
| 2006/0152207 A1 | 7/2006 | Riebel et al. | |
| 2006/0153173 A1 | 7/2006 | Beck et al. | |

FOREIGN PATENT DOCUMENTS

| | | |
|---|---|---|
| KR | 2002-0014945 | 2/2002 |
| WO | 03/030501 A1 | 4/2003 |
| WO | 03/030502 A1 | 4/2003 |
| WO | WO 03/090432 A1 | 10/2003 |

OTHER PUBLICATIONS

Slawson, "Caller ID Basics" Caller ID, http://www.testmark.com/develop/tml_callerid_cnt.html, Oct. 31, 2001.
OKI Silicon Solutions Company, Japan Site, "Multi Lingual Test-to-Speech Processor ML2110." http://www.oki.com/semi/english/ml2110/html, Nov. 1, 2001.
Voice-6090 "Talking Caller ID", Aastra Telecom-Taking Caller ID-Voice 9090, http://www.aastra.com/produts/callerids/voicecallerid/be-6060.html Nov. 5, 2001.
Voice-9090 "Talking Caller ID", Aastra Telecom-Talking Caller ID-Voice 9090, http://www.aastra.com/produts/callerids/voicecallerid/be-9090.html Nov. 5, 2001.
"Talking Caller ID", Stealth Software, http://www.talkingcallerid.com/, Talking Caller ID-Featuring Talking, Paging, Email, Voice Mail, Blocking, Text-to-speech, Nov. 5, 2001.
"Address Allocation for Private Internets", Rekhter et al., Feb. 1996.
"SIP Session Initiation Protocol", Handley et al., Mar. 1999.
"The IP Network Address Translator (NAT)", Egevang et al., May 1994.
International Search Report, PCT/US02/29988, Sep. 23, 2002.
Bellcore Specification TR-NWT-000310, Calling Number Delivery, Issue 4, Dec. 1992.
Bellcore Specification TR-NWT-001188, Calling Name Delivery Generic Requirements, Issue 1, Dec. 1991.
Mark H. Norris, Transmitter Architectures, 1998, IEE, pp. 4/1-4/6.
J. Bosswell, G. Lingenauber, An Advanced HF Receiver Design, Jul. 1994, IEE, Conference Publication No. 392, pp. 41-47.
"RBS 884 Pico System Description", Authori Unknown, Ericsson 1/1551-AE/LZB 119 2269 Uae Rev A, Apr. 23, 1998.
U.S. Appl. No. 09/468,888, filed Dec. 22, 1999, Bedingfield.
U.S. Appl. No. 09/812,338, filed Mar. 19, 2001.
U.S. Appl. No. 09/992,165, filed Nov. 6, 2001.
U.S. Appl. No. 10/032,724, filed Dec. 27, 2001.
U.S. Appl. No. 10/144,555, filed May 13, 2002, Koch.
U.S. Appl. No. 10/144,556, filed May 13, 2002.
U.S. Appl. No. 10/152,544, filed May 21, 2002.
U.S. Appl. No. 10/174,026, filed Jun. 18, 2002.
U.S. Appl. No. 10/200,874, filed Jul. 23, 2002.
U.S. Appl. No. 10/200,905, filed Jul. 22, 2002, Ghazarian.
U.S. Appl. No. 10/200,906, filed Jul. 23, 2002.
U.S. Appl. No. 10/201,706, filed Jul. 23, 2002.
U.S. Appl. No. 10/702,329, filed Nov. 6, 2003, Kreiner.
U.S. Appl. No. 10/746,804, filed Dec. 24, 2003, Perrella.
U.S. Appl. No. 10/884,504, filed Jul. 2, 2004, Kreiner.
U.S. Appl. No. 10/891,883, filed Jul. 15, 2004, Smith.
U.S. Official Action dated Sep. 9, 2004 cited in U.S. Appl. No. 09/888,832.
U.S. Official Action dated Dec. 28, 2004 cited in U.S. Appl. No. 09/888,926.
Mize, Gary, Patent Pend. Projected Caller ID Own 50% Look [online], Sep. 10, 2000 [retrieved on Sep. 20, 2000].
"Venture IP Telephone System" AASTRA (website) 2 pages http://www.aastra.com/products/callerids/voicecallerid/be-6060.html> Accessed on Aug. 1, 2005.
Venture IP Telephone System" AASTRA (website) 2 pages http://www.aastra.com/products/callerids/voicecallerid/be-6090.html> Accessed on Aug. 1, 2005.
"Venture IP Telephone System" AASTRA (website) 2 pages http://www.aastra.com/products/callerids/voicecallerid/be-9090.html> Accessed on Aug. 1, 2005.
"Talking Caller ID" by Stealth Software, (website 5 pages) http://www.talkingcallerid.com/, Accessed on Aug. 31, 2005.
CNX Audio Conference Bridge, AASTRA (quicklinks) 2 pages http://aastra.com/products/callerids/voicecallerid/be-9090.html Accessed on Aug. 31, 2005.
"Smarthome, The CallerID System That Speaks for Itself!", (website) 2 pages http://www.smarthome.com/5154.html Accessed on Aug. 31, 2005.
"Multi-Lingual Text-to-Speech Processor ML2110", (website) 5 pages http://www.oki.com/semi/english/ml2110/html Accessed on Aug. 31, 2005.
Partridge, H1714, Mar. 3, 1998.
T. Farley et al.; "Cellular Telephone Basics: AMPS & Beyond;" [online]; [retrieved on Mar. 6, 2003]; retrieved from the Internet http://www.privateline.com/Cellbasics/Cellbasics.html.
International Search Report PCT/US02/30068, Dec. 9, 2002.
"Time Division Multiple Access (TDMA);" [online]; [retrieved on Mar. 6, 2003]; retrieved from the Internet http://www.iec.org/online/tutorials/tdma/.

* cited by examiner

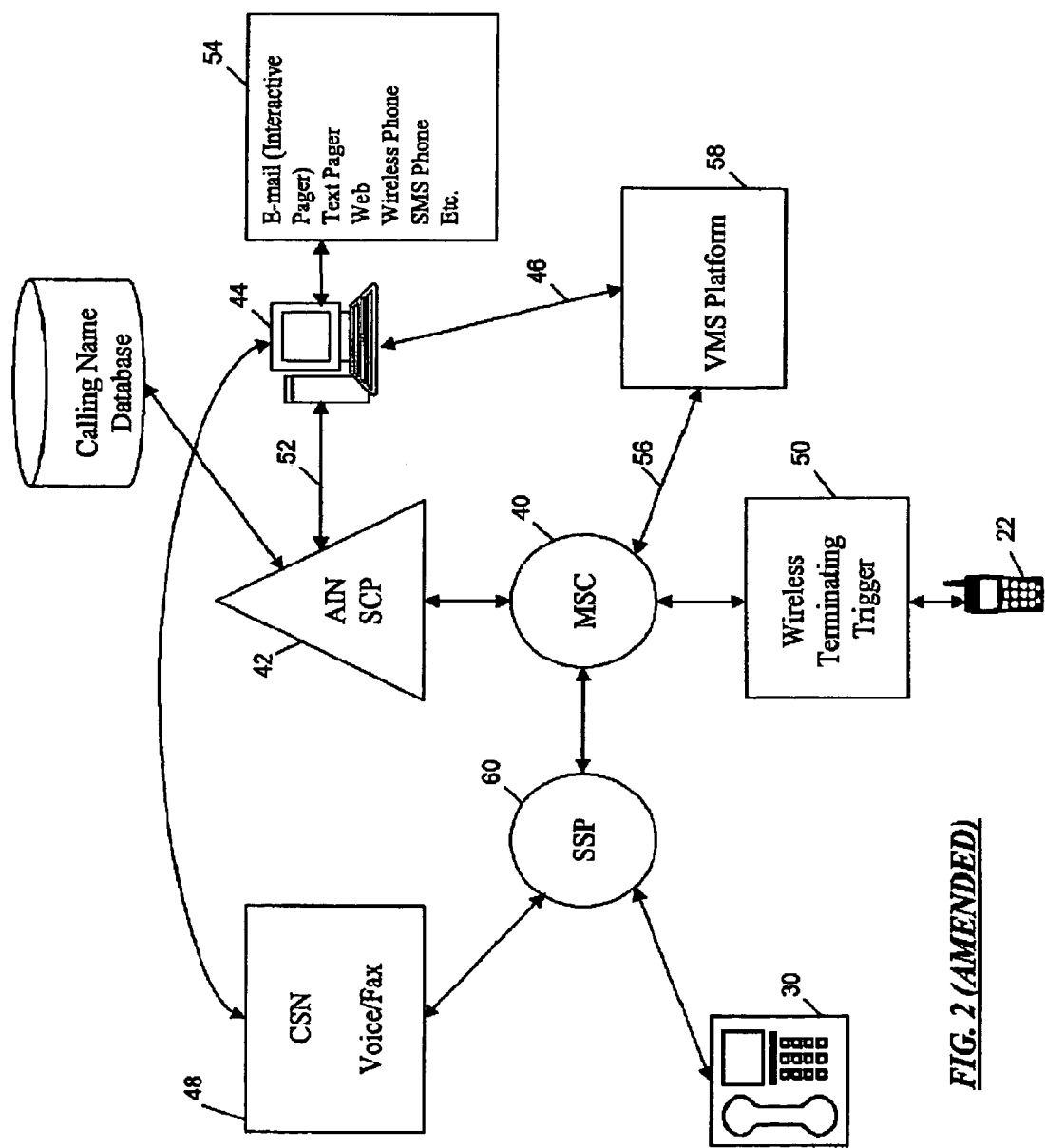
FIG. 2 (AMENDED)

METHOD FOR USING AIN TO DELIVER CALLER ID TO TEXT/ALPHA-NUMERIC PAGERS AS WELL AS OTHER WIRELESS DEVICES, FOR CALLS DELIVERED TO WIRELESS NETWORK

CROSS REFERENCE TO RELATED APPLICATIONS

This application claims priority to U.S. Provisional Application Ser. No. 60/312,138, filed Aug. 14, 2001, entitled "METHOD FOR USING AIN TO DELIVER WIRELINE CALLER ID TO TEXT/ALPHA NUMERIC PAGERS AS WELL AS OTHER WIRELESS DEVICES." This application relates to Ser. No. 09/742,765, filed Dec. 20, 2000, entitled "SYSTEM AND METHOD FOR MONITORING INCOMING COMMUNICATIONS TO A TELECOMMUNICATIONS DEVICE," which is incorporated herein by reference. This application also relates to 60/312,281, filed the same day as the present application by Bedingfield, entitled "METHOD FOR USING AIN TO DELIVER CALLER ID TO TEXT/ALPHA-NUMERIC PAGERS AS WELL AS OTHER WIRELESS DEVICES, FOR CALLS DELIVERED TO LANDLINE NETWORKS" the disclosure of which is also incorporated herein by reference.

NOTICE OF COPYRIGHT PROTECTION

A portion of the disclosure of this patent document and its figures contain material subject to copyright protection. The copyright owner has no objection to the facsimile reproduction by anyone of the patent document or the patent disclosure, but otherwise reserves all copyrights whatsoever.

BACKGROUND OF THE INVENTION

1. Field of the Invention

This invention relates generally to the field of communications. More particularly, this invention manages detailed information about all incoming communications to and all outgoing communications from a wireless communications device, such as a cellular phone connected to the Cellular Mobile Telephone Network (CMTN), and delivers this information to a wireless communications device, such as an alphanumeric pager.

2. Description of the Related Art

The field of telecommunications has experienced explosive growth, and more growth is planned as telecommunication access and numerous communication devices improve. This explosive growth is revolutionizing message notification and similar services. For example, U.S. Pat. No. 6,006,087 discloses a method and system for delivering a voice mail notification of a voice message left on a user's wireless service network. When a message is left in a user's mailbox assigned to the user's cellular phone, the voice mail system generates a voice mail notification that includes a calling number, the name of the calling party, and an index listing various messages so that a user can scroll through the messages and choose a desired message to retrieve and play. The voice mail notification is forwarded to and displayed by the cellular phone operated by a user.

In today's telecommunications world, it is commonplace for users to have multiple wired (i.e., landline) and wireless communications devices connected to various global telecommunications networks. For example, a user may have a first phone number assigned to a residential landline telephone, a second phone number assigned to a business telephone, a third phone number assigned to a mobile phone, and a fourth phone number assigned to a wireless paging device. Thus, many users have multiple wired and wireless devices with each device having a different phone number and with each device connected to different messaging systems and to different communications networks.

When an incoming communication is placed to a particular communications device, a user typically has no way of knowing about that incoming communication if the user is away from the communications device. Using a conventional approach, when a message is left on a messaging system assigned to a particular communication device, the messaging system causes the associated communications network to set the message waiting indicator on the called communications device; however, it is incapable of setting detailed messaging information on the user's other additional communications devices (wired and wireless). For example, when a message is left on a user's mobile phone messaging network, the user's paging device is incapable of providing detailed messaging information associated with the message left on the mobile phone messaging network. Since the purpose of having multiple communication devices is to allow a user to maintain constant communication, conventional approaches fall short by not being able to provide the ability to deliver detailed messaging information across all communication devices. Within the prior art, users have attempted to overcome this deficiency by utilizing a feature in voice mail systems referred to as outbound calling. An outbound calling feature allows a user to designate a telephone number (that may be assigned to a different communications device) that is dialed by the voice mail system during a fixed time period if a message is waiting for the user in the voice mail system.

Using this approach, users have also designated pagers' phone numbers as the number to be called for the outbound calling, or, have designated the telephone number of a wireless or landline telephone. One problem associated with designating a pager as the device to be called by the outbound calling is that it requires a user to carry both a pager to receive a general notification and a cellular phone to receive the detailed information. One problem associated with directing calls from the outbound calling feature to a wireless phone or a landline phone is that the user may not wish to access or to be bothered by all detailed message notifications.

In addition to receiving real-time information related to messages received and stored in a voice mail system, A user may also desire to know about all incoming communications to a communications device, such as a cellular telephone. For example, a user may desire to know if an incoming communication is being answered, if it receives a busy signal, if it is terminated, if it is forwarded to a different communications device (i.e., there currently isn't any way for a user to know about all incoming communications when a line is ringing, answered, busy, etc., with detailed call information).

Users who miss calls would like a way to know who has called them and whether or not that caller left a message. A user can obtain this information in a proactive way by calling their voice mail systems/answering machines at will and determining whether there are any messages. However, this does not provide a complete list of who has called them, just who left a message. Some Customer Premises Equipment (CPE) is capable of paging a user when an incoming call arrives, but this is limited to a pre-programmed set of callers they wish to be notified about. CPE is used to refer to equipment that a customer connects to the telephone system. Moreover, CPE does not announce the Calling Name delivery (CNAM) and Caller Identification (ID) because of the expense involved in doing so. Also, the duration of a call that does not terminate at the customer's premises is unknown by the CPE (for example, the call went to voice mail).

Thus, there is a current need for systems and methods for selecting, retrieving, storing, and managing detailed information related to all incoming communications to and all outgoing communications from a landline communications device. There is a further need to efficiently deliver this information to a remote communications device in order to provide real time and quasi-real time detailed message notification and similar information. There is still a further need to forward the communication or its equivalent to the remote communications device. Finally, there is a need to harmonize such information associated with multiple landline communications devices using different messaging systems.

BRIEF SUMMARY OF THE INVENTION

To overcome these problems, the present invention provides easy, reliable, and efficient methods and systems for providing detailed call information relating to all incoming communications to a communications device, such as a wireless phone, and delivers this information as a remote call notification to a remote communications device, such as an interactive pager. Further, this invention includes a system that manages all detailed call information about all incoming communications to a communications device and manages how this information is delivered and presented to the remote communications device. In an embodiment, the remote call notification is delivered in real-time or in quasi real-time, as delivery speed to the remote communications device varies depending upon the delivery medium. The remote call notification may be automatically forwarded to the remote communications device upon the arrival or termination of a new incoming communication. Alternatively, the remote call notification may be forwarded to the remote communications device using rules established by a subscriber, a calling party, a forwarding party, an administrator, and by other constraints (e.g., availability and load of the communications link to the remote communications device).

In a preferred embodiment, this invention detects an incoming communication, such as a phone call, on a communications link to a subscriber's communications device, such as a wireless telephone. Once an incoming message is detected, this invention creates a remote call notification that includes detailed information about the incoming communication. For example, the detailed information may include: (a) a calling number; (b) a name of a calling party associated with the calling number; (c) time identifiers that provide the times when the incoming communication is first detected and is terminated; (d) a length identifier that provides the length of the incoming communication; (e) a date identifier that provides the date that the incoming communication is received; (f) a status identifier that provides a real-time status of the incoming communication; (g) a disposition identifier; and (e) a priority identifier that indicates the importance of the incoming communication.

In one embodiment, the status identifier indicates a real-time or quasi real-time status of the incoming communication into the network of the subscriber's communications device. For example, if the subscriber's communications device is a cellular phone connected to the CMTN, then the terminating switch in conjunction with the service control point (SCP) can report the following status identifier's: (a) ringing, (b) answered, (c) busy, and (f) disconnected.

In one embodiment, the disposition identifier provides information about the remote notification itself. For example, the disposition identifier can indicate that a remote call notification is "new" and that a subscriber has not reviewed the details of the incoming communication. Other examples of the disposition identifier include: (a) stored, (b) deleted, (c) restored, (d) forwarded, and (e) system administration This invention assigns an access address to one or more remote communications devices to receive the remote call notification. The remote communications device is any communications device capable of delivering remote call notification to a subscriber, such as, for example, a landline phone, mobile phone, a cellular phone, a satellite phone, a computer, a modem, a pager, an interactive pager, a personal digital assistant (PDA), and an interactive television. An exemplary embodiment of an access address for a computer may be a TCP/IP address, an instant messaging screen name, or an e-mail address.

The access address to be used can be determined using a number of different methods. For example, the access address can be selected by a subscriber's preferences, by a calling party's preferences, by a forwarding party's preferences, by an administrator of the communications network storing the remote call notification, and by the communication capabilities of the remote communications device (e.g., a calling party leave a video clip message and the network forwards it to a remote communication device capable of displaying the video clip, such as, for example, a PDA with appropriate display After a call is received and an access address is assigned, the remote call notification is forwarded to the remote communications device. The remote call notification is presented to the remote communications device in a subscriber-friendly format, such as, for example, an audio format, a text format, a short message service (SMS) format, a video format, or a markup language document format. Alternatively, a voice interface may be created so that a subscriber of a remote communication device receives a remote call notification and can retrieve more information about the remote call notification by dialing a phone number.

This invention also allows a subscriber of the remote communications device to scroll through a plurality of remote call notifications (i.e., a log of remote call notifications), to select a particular remote call notification to retrieve an associated communications message (e.g., a voice mail associated with the remote call notification), and to present the communications message on the remote communications device (e.g., play the sound annotation of the voice mail).

Further, the log of remote call notifications may be accessed by a subscriber or another subscriber (e.g., a calling party that has left a plurality of messages). The log may be retrieved in various ways, such as, for example, for the current day, for the previous day, for the last 1000 calls, for a particular calling party, and so on. Alternatively, retrieval of the log may include a voice interface so that subscribers can retrieve the log of remote call notifications by dialing a phone number.

In one embodiment, the remote call notification is delivered quasi-real time to an interactive pager or to a personal computer in the form of an instant message or data packet that activates an Internet Call Waiting-like pop-up screen (e.g., a pop-up web page). Similarly, the remote call log is delivered to interactive pagers, web pages, e-mail, and phone (e.g., a phone with a VXML interface). The subscriber is able to interactively configure the remote call notification and remote call log services through a computer connected to the world wide communications network, such as, the Internet, intranet, or extranet. Alternatively, the subscriber can configure his/her remote call notification services through a service representative.

Thus, this invention allows real-time remote call notification that is flexible to telecommunications subscribers having multiple communications devices, including multiple wireless communications device. This invention notifies a subscriber of all incoming communications, provides detailed information about each incoming cornmunication, allows a subscriber to manage each incoming communication, and provides an option to retrieve and play each incoming communication to a remote communications device.

This invention allows a subscriber to always know about incoming communications even if the line was busy, multiple calls were received at the same time, and if the caller hung up before the call was answered. This invention allows small business subscribers to always know who called and when. Further, this service is useful for subscribers that do not like to check their voicemail often unless they receive an important message, especially when calling long distance to check their voicemail.

To summarize the primary benefits, this invention: (1) allows cellular (wireless) subscribers to know who calls them virtually anywhere; (2) allows a subscriber to obtain information from incoming calls in real-time; (3) allows a subscriber to access a call log of recent calls; (4) indicates who called (name & number) and when (date & time), as well as certain call dispositions (answered, length of call, busy, call abandoned, voicemail left); (5) allows a subscriber to receive information about incoming calls using different devices (e.g., pagers, mobile phones, web browsers, personal computers, PDAs, etc.); and (6) allows a subscriber to customize useful configuration options (e.g., priority and filter-out numbers, caller information delivery based on call outcome, etc.).

BRIEF DESCRIPTION OF THE DRAWINGS

These and other features, aspects, and advantages of the methods and systems for using an AIN to deliver caller ID to wireless devices utilizing landlines are better understood when the following Detailed Description of the Invention is read with reference to the accompanying drawings, wherein:

FIG. 2 is a block diagram illustrating the Caller ID Anywhere (CIDA) service system architecture for a wireless system in accordance with an exemplary embodiment of the present invention.

DETAILED DESCRIPTION OF THE INVENTION

Figure 1:
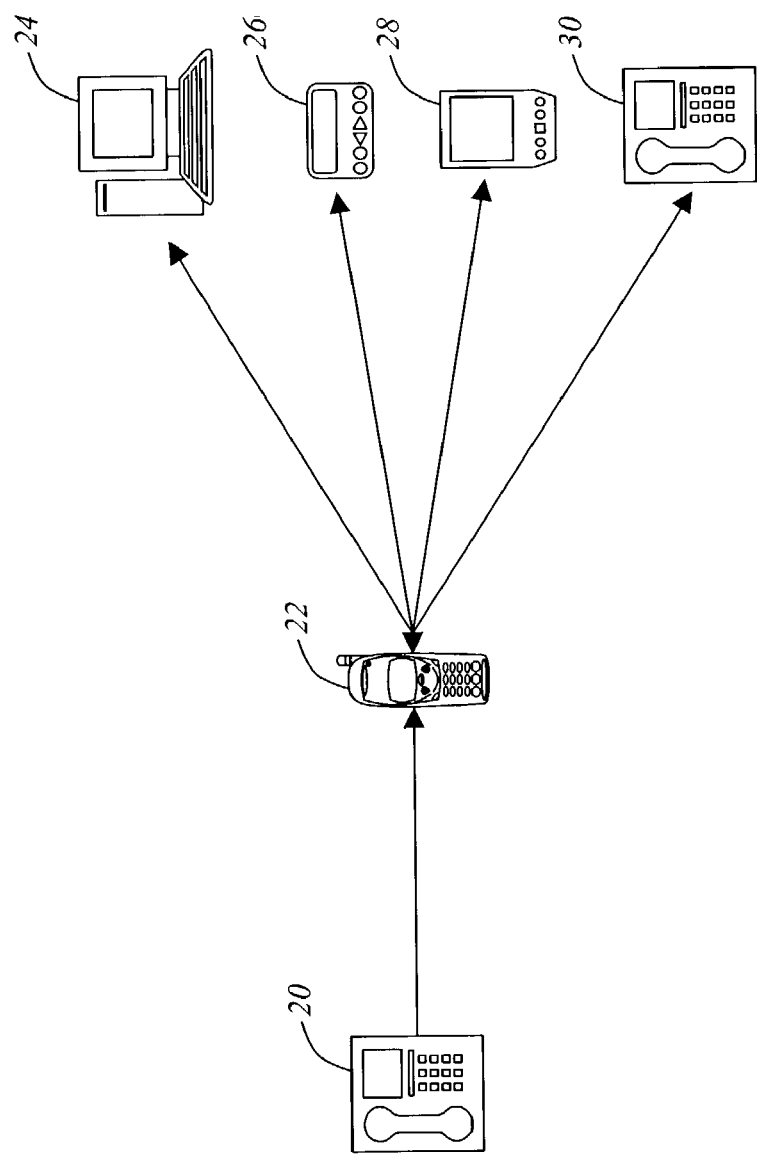
FIG. 1 is a diagram illustrating call flow through communication devices in accordance with an exemplary embodiment of the present invention.

As required, detailed embodiments of the present invention are disclosed herein, however, it is to be understood that the disclosed embodiments are merely exemplary of the invention that may be embodied in various and alternative forms. Specific structural and functional details disclosed herein are not to be interpreted as limiting, but merely as a basis for the claims as a representative basis for teaching one skilled in the art to variously employ the present invention. Conventional hardware and systems are shown in block diagram form and process steps are shown in flowcharts.

The term "calling party" is used herein generally to refer to the person or device that initiates a telecommunication. The calling party may also be referred to herein as "caller." In some examples, the calling party may not be a person, but may be a device such as a facsimile machine, an answering machine, a modem, etc. The term "called party" is used herein generally to refer to the person or device that answers or responds to the call or communication. The term "communication" is used herein to include all messages or calls that may be exchanged between a calling party and a called party, including, voice, video, and data messages. The term "communication" is used synonymously herein with the term "call" unless a distinction is noted. The term "subscriber" is used herein to generally refer to a subscriber of the described telecommunications service. The term "Internet" refers to both the Internet and an intranet, unless a distinction is noted. Similarly, the term "Internet-accessible device" refers to a data communications device that has the capability to access the Internet or an intranet.

In one embodiment, the present invention provides a new telecommunications service referred to as Call ID Anywhere (CIDA) (also referred to as Calling Name Anywhere or Remote Call ID). In brief, this service allows a customer to obtain calling number and name, date & time of call, and call outcome information away from the cellular phone to be monitored. The service actually consists of two main components: Remote Call Notification (RCN), and Remote Call Log(RCL).

In one embodiment, the RCN service delivers information of an incoming call in quasi real time (delivery speed depending on the delivery medium). The information is sent automatically upon the arrival and/or termination of a new call. The information about the incoming call can be delivered as a web page, as an e-mail, as a Short Messaging Service (SMS) message, etc. If the information is delivered via an e-mail, the notification can be sent to an e-mail account, alphanumeric pager, interactive pager, Personal Digital Assistant (PDA), and given proper processing to an SMS-capable phone. If the information is delivered via a web page, more than one call state can be reported, e.g., ringing, answered, busy, hang up. The call information consists of the name and number of the caller (if available), date and time of the call, as well as additional information if available.

In one embodiment, the RCL service consists of a log of recent calls. The information in the call log can be sent to the subscriber automatically (periodically), but in most cases, the subscriber retrieves the information as desired. As with the RCN service, the call log includes essential call information such as the name and number of the caller, as well as the date and time of the call. Additional information, such as the length of each call, can also be included if available. The delivery methods for the call log information are the same as with the RCN service. In addition, the RCL service includes a voice interface so that subscribers can retrieve call log information by dialing a telephone number. Call log information can be retrieved for the current day, previous day, etc.

Briefly, the Caller ID Anywhere service of the present invention works in the following way. For call notification, a subscriber receives a call to his/her phone. The service checks to determine how the customer desires to be notified about the call, namely, via interactive pager, e-mail, and/or via a page that pops-up in the subscriber's computer screen. If notification is to occur via interactive pager (e-mail), the service waits until the call ends and then sends a page (a specially-formatted e-mail) to the interactive pager. If notification is to occur via PC, the service opens a window on the designated PC, which the subscriber has designated beforehand. Up to several PC updates may be sent per call event: one as soon as a new call is received; another when the phone is answered or it is determined that the line is busy; and one when the call ends, indicating the final outcome of the call (e.g., voice-mail left or call length). The PC window may be activated using special CIDA client software, or using a java-based browser interface.

For call log requests, a subscriber can request call log information at any time. To retrieve call logs using an interactive pager, a subscriber sends a Short Message to a predefined address. The message contains a command to specify the record(s) to be retrieved. If a web browser is used, the subscriber logs into a web page for the service and requests the desired record(s). A subscriber also has the option of calling a number and then following instructions for the retrieval of the call record(s), either by listening to the record(s), or by requesting that the record(s) be sent to a fax number.

According to one embodiment, the systems of the present invention utilize the intelligent functionality of an Intelligent Network (IN). An IN is a network which can be used in conjunction with a conventional telephone network, such as the Cellular Mobile Telephone Network (CMTN), to provide enhanced voice and data services and dynamic routing capabilities Referring to FIG. 1, looking at the CIDA service of the present invention briefly, the service allows subscribers to know who calls them no matter where the subscriber is located. The service allows a subscriber to obtain information regarding incoming calls from a caller device 20 in real-time, or quasi real-time, and have access to a call log of recent calls. The service indicates who called (name and number) a subscriber telephone 22 and when (date and time), as well as certain call dispositions (answered, length of call, busy, call abandoned, and voice-mail left). The caller information is accessed using a number of subscriber devices, such as an personal computer 24, an interactive pager 26, a personal digital assistant (PDA) 28, a landline telephone 30, etc.

Referring to FIG. 2, in one embodiment, call-processing architecture in which the CIDA service of the present invention is provided to cellular (wireless) subscribers is shown. The main hardware/software components of the CIDA service include a home Mobile Switching Center (MSC) 40, Service Control Point (SCP) 42, CIDA server 44, Service Switching Point (SSP) 60, and an Intelligent Peripheral, such as a Compact Service Node (CSN) 48.

The home MSC 40 of the subscriber's line is equipped with a WIN, CAMEL, or other wireless termination attempt trigger (TAT) 50, or any other suitable terminating trigger, such as a dialed number trigger. The TAT 50 is provisioned on the subscriber's cellular service. Upon receiving a call, the TAT 50 fires and the switch, using the appropriate wireless protocol, requests instructions from the SCP 42 as to how to proceed with the call. The SCP 42 responds with an authorize termination. The SCP 42 requests from the switch that it is notified about subsequent changes in the call state (i.e., busy, answer, disconnect) as soon as these happen. (The availability of such notifications will be dependent on the particular wireless IN implementation, and potentially on the roaming status of the subscriber). When a change in the call state occurs, the home MSC 40 notifies the SCP 42 immediately The SCP 42 handles queries from the TAT 50. The SCP 42, by communicating with the subscriber's MSC 40, keeps track of call events related to the subscriber's wireless service, and notifies the CIDA server 44 appropriately. The SCP 42 responds to the TAT 50 query with an appropriate termination instruction, and requests to be notified whenever there is a change in the status of the call (e.g. it requests termination notification). The SCP 42 is also aware of the different possible status of a call, namely, ringing, busy, answer, and disconnect. Whenever there is a change in the status of the call, the SCP 42 sends a message to the associated CIDA server 44 to notify this change. The SCP 42 is provisioned one-time with the CIDA server IP address, assuming TCP/IP connectivity 52 is used. For each new subscriber, the SCP 42 is provisioned with the new subscriber number and any pertinent additional information so that the SCP 42 can respond to the TAT 50 query. Also, the SCP 42 generates measurements which may need to be retrieved periodically.

The CIDA server 44 serves as web host for the CIDA service, keeping subscriber information as well as all call records. All call notifications originate from the CIDA server 44. The CIDA server 44 also handles and serves all requests for call log information from subscribers. The CIDA server 44 also communicates with the CSN 48 and receives data from the voice mail system, over the VMS interface 46. The CIDA server 44 is the main component of the CIDA service. In brief, the CIDA server 44 is a data repository, web server, administration server, CSN server, and e-mail server. The CIDA server 44 receives and processes call state updates from the SCP 42, receives and processes voice-mail notifications from the Voice Mail Interface 46, performs administrative functions for subscribers, returns queries for call log information back to the subscriber with the appropriate data (queries in the form of e-mails or queries through a web page), and notifies subscribers of pertinent call events according to the device(s) that are specified by the subscriber. At a minimum, the CIDA server 44 is provisioned with the telephone numbers for the CIDA subscriptions. Also, depending upon the subscribers' preferences, parameters may be provisioned as well when entering a new subscriber, such as devices 54 and their electronic addresses that are supported for call notification and call log(e.g., SMS service addresses, interactive pagers, e-mail accounts) in addition to a web browser, and maximum call log capacity if an active subscriber has requested an expanded call log.

The CSN 48 is used to provide an Interactive Voice Response (IVR) or Voice Extensible Markup Language (VXML) interface for retrieving call log information. The CSN 48 allows subscribers of the CIDA service to obtain call log information over the phone. For each session (i.e., for each call to the CSN 48), the CSN 48 is in constant communication and requests subscriber data from the CIDA server 44. The CSN 48 verifies that the calling party is calling from the subscribed phone and has the proper Personal Identification Number (PIN). The CSN 48 also allows a subscriber to check the call log or to request that a call log be sent to a fax number. The CSN 48 asks the subscriber which log is to be played/sent (e.g., today's, yesterday's, or for a specific day). A subscriber is able to fast forward, skip back or forward, or even erase call log entries. Call log entries may be erased for the IVR interface. Erased call log entries may be erased for convenience for the IVR interface, but may still be available over the Internet. Up to about 100 caller records may be retrieved over the IVR interface. The IVR interface also has an option that allows a subscriber to provide a fax number where call log information can be sent. Aside from initial service provider access and load and communication with the CIDA server 44, no additional provisioning is required.

The VMS interface 46 is attached to the Voice-Mail Service (VMS) platforms 58 that serve an appropriate region. The voice mail system, using interface 46, notifies the CIDA server 44 when it "sees" that a voice-mail platform 58 is notifying a home switch to turn on voice-mail waiting notification for a specific subscriber. In summary, the voice mail platform communicates new voice mail information (calling number, message indicator, length of message, etc.) directly to the CIDA server 44.

Once the CIDA service of the present invention is provisioned on a subscriber's line, the CIDA server 44 automatically begins logging calls to the subscriber's line. CIDA functions and options may be initially set to an initial default level of monitoring. Multiple methods are provided to administer the whole or parts of the service. Using the service for the first time, a subscriber can access a CIDA web adrministration page, or can call a service representative to set up and start the service.

The different interfaces needed for the CIDA service include RCN and RCL. The RCN interface includes: (1) a web or PC client page that notifies a subscriber of a new call, the interface presents data and may offer a number of action buttons; (2) an interactive pager notification for the presentation of data in e-mail; and (3) web page-based administration of the service, which is accomplished using a comprehensive interface that allows the subscriber to control and customize the RCN service. The RCL interface includes: (1) a web page that provides several options (e.g., numbers to filter, time window, etc.) for the display of call log data; and (2) a touch-tone-based interface for playing call log data using an IVR. The interface also provides an option to request that call records be sent to a fax machine.

Figure 3:
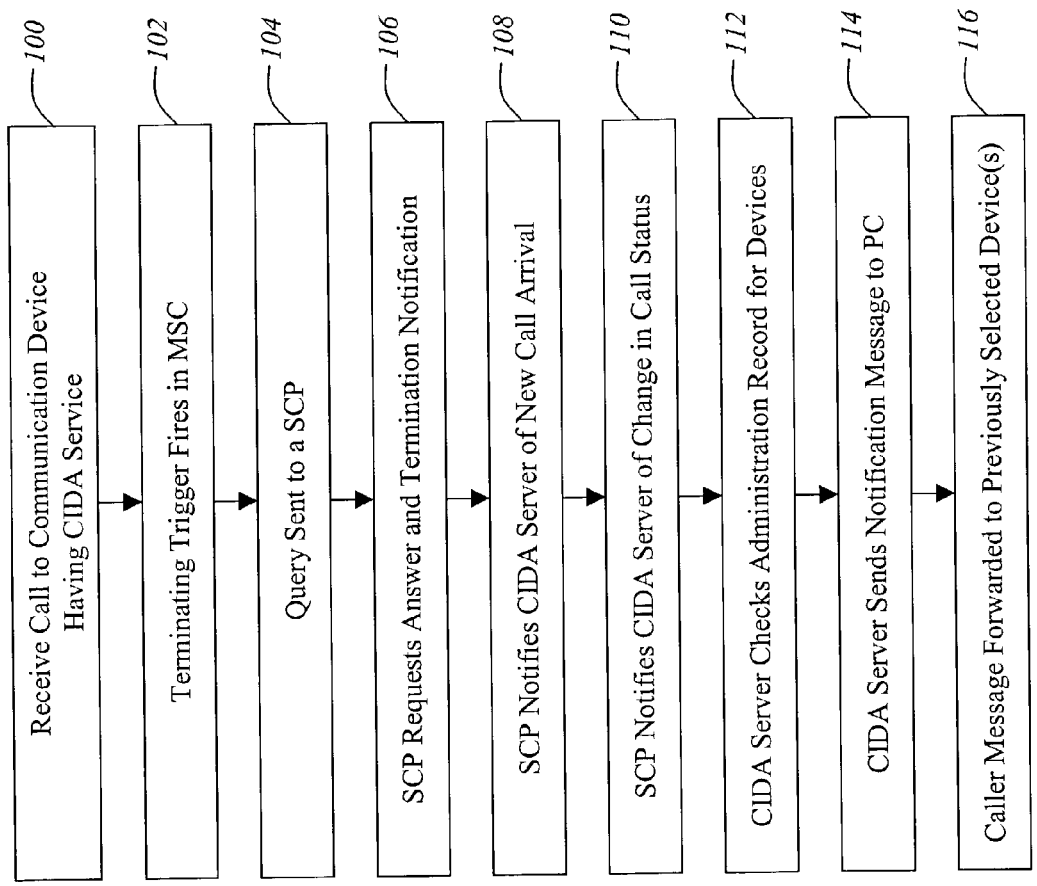
FIG. 3 is a flow diagram illustrating call flow for call notification in accordance with an exemplary embodiment of the present invention.

Referring to FIG. 3, call flows for call notification, a calling party first calls a number that subscribes to the CIDA Service in Step 100. When call setup reaches the final MSC 40 (the wireless switch for that subscriber), a TAT 50 for that number is triggered in Step 102. A query is then sent to the SCP 42 in Step 104. In Step 106, the SCP 42 responds to the switch authorizing termination, and in addition, requests an answer and termination notification. In Step 108, the SCP 42 then sends a message to the CIDA server 44 immediately notifying the server 44 of a new call arrival. In Step 110, as soon as the SCP 42 hears from the MSC about a change in the status of the call (answered, call dropped, disconnect, busy), the SCP 42 notifies the CIDA server 44 of a change in status. In Step 112, when the CIDA server 44 is notified of a new call, the CIDA server 44 checks the administration records of the subscriber to determine if the server 44 is required to notify a device 54 of the new call arrival. If so, in Step 114, the CIDA server 44 sends a message to the subscriber's pre-determined personal computer 24 so that the computer 24 can open a window describing the new call. The changes in status of a call may result in additional messages being sent by the CIDA server 44. In Step 116, the end of a call can result in a message being sent to the subscriber's previously selected device 54 (e.g., interactive pager, e-mail, SMS phone, etc.). The CIDA server 44 can also receive messages from the VMS interface 46 in order to determine if a recently ended call resulted in a voice-mail left for the subscriber.

A subscriber can retrieve call log information by either accessing an Internet-connected device (e.g., computer with web browser, interactive pager, SMS phone, etc.), or, by calling a phone number that provides an IVR or VXML interface for the retrieval of the call log information. The retrieval of call log information data through an Internet-connected device generally does not require making a phone call specifically for this purpose. Rather, the subscriber is able to request data by accessing a web site and "clicking" for the desired information, or by sending a request by other means, e.g., by sending an SMS message with a command to request this data.

If a subscriber desires to retrieve call log information via phone, he/she can call a phone number that terminates on a CSN 48. The CSN 48 includes an IVR/VXML interface that is operable for aiding a caller in navigating different options when retrieving call log information. Also, the IVR/VXML main menu may provide a "fax option". For this option, the subscriber may enter a phone number, and call log information is automatically faxed to this number.

Administrative functions for the CIDA service can be performed from a web browser by accessing a CIDA administration page, the IVR/VXML interface (only pertinent to call log retrieval through the IVR/VXML interface, including FAX requests), and an interactive pager in the form of specially formatted e-mails (e-mail-based administration will only affect call notification and call log retrieval through the interactive pager).

In order to access the web-based administration page, a subscriber needs to enter the subscribed phone number as well as a PIN. At a minimum, a subscriber will find the following functions and options available: (1) the ability to turn the whole CIDA service "ON" or "OFF". Default is "OFF"; (2) the ability to change a PIN; (3) there will be columns for each supported device (interactive pager, PC, e-mail); (4) pull-down menus that lists when the service should be "ON": e.g. standard (all times), weekdays only (Mo-Fr), weekends only (Sa, Su), notification for particular device "OFF" (default); (5) a field that allows a subscriber to change his/her e-mail address; (6) for the interactive pager and e-mail columns, the subscriber can set a checkmark so that call notification will occur depending upon the call event detected (e.g. answered calls, unanswered calls, busy calls, and calls that resulted in voice-mail). The default setting is that all of these boxes will be checked; (7) for the PC column, the subscriber can set a checkmark so that notifications(s) can occur as soon as the following call events are detected: 1) Ringing, 2) Call Answered, 3) Busy detected, 4) Hang up, 5) Voice-mail detected. The default setting is that all of these boxes will be checked; (8) the ability to set "priority numbers" for each device. When a call is received from a priority number, it overrides the settings in 6 & 7, and the notification is allowed. Also, for numbers entered that have less than 10 digits, a wildcard character, such as "*", can be assumed at the end of the last digit; and (9) the ability to set "filter-out numbers" for each device. When a call is received from a filter-out number, no notification is sent to the device. The wildcard characters mentioned above can also be applicable for filter-out numbers.

The call log administration page can be accessed through the call notification administration page. This paragraph presents examples of the controls that are available for subscribers that want the log to be sent to their interactive pager or to a specific e-mail address. At a minimum, the following functions and options are available to the subscriber for both the interactive pager and the specific e-mail address: (1) the ability to change the e-mail address (not available for interactive pagers); (2) the ability to set a "filter-out number" for each device. These are numbers that are used to filter-out the call log records before they are sent. Wildcard characters "*" and "?" can also be used; (3) the ability to set the maximum number of records that can be sent; (4) the ability to set "show-only number". When this option is chosen, only records that contain the "show-only number" are sent. Wildcard characters "*" and "?" can also be used; and (5) the ability to set the following delivery options: 1) Now, 2) Daily (and time), Weekly (what day Mo-Su and time), and Monthly (what day and time).

A small number of administration functions are provided for subscribers that use an IVR/VXML interface, such as password change and fax number change (where the call log can be sent). Administration functions are also provided to subscribers that receive call notification and/or call logs through their pager. The administration functions execute by sending an e-mail from the registered pager or e-mail address to the e-mail addresses that delivers the call notifications and the call logs, which includes a simple command in the subject line. For multiple commands, the body of the e-mail may be used. All commands sent, if properly executed, receive a confirmation. A sample of commands that can be sent are as follows:

For Call Notification:

NOTIFICATION [ON, OFF, WEEDAY, WEEKEND] (blank returns current ON/OFF state of notification service)

FILTEROUT [numbers(s)]

CANCEL FILTEROUT [number(s)] (blank will delete all current filter-out numbers)

PRIORITY [numbers(s)]

CANCEL PRIORTY [NUMBERS(S)] (blank will delete all current priority numbers) For Call Log:

LOG LIMIT [number]

SEND LOG [TODAY, YESTERDAY, MM/DD/YY] (blank sends current call log up to maximum number of records specified in LOG LIMIT]

FILTEROUT [number(s)]

CANCEL FILTEROUT [number(s)] (blank will delete all current filter-out numbers)

SHOW ONLY [number(s)]

CANCEL SHOW ONLY [numbers(s)] (blank will delete all current priority numbers)

When PC-based call notification has been set, a pop-up window may appear on the screen according to the settings described above. For a given call, there may be several windows displayed on the screen, corresponding to: call ringing, call busy, call answered, call disconnect, voice-mail left. Each new screen may replace the previous screen. The notifications are sent as soon as the call event is detected, so that if possible, notifications will appear in real-time. Depending upon the call state, the name and number of the caller ("Private" or "Unknown" may appear instead when the calling number is blocked or unknown), the date and time of event, and the call state (if the call state is "disconnect", the total call time will be displayed as well) may be displayed on the screen.

General controls may also appear under the screen, such as "Close" which closes the window, "View Log" which opens web page, "Suspend" which suspends the delivery of call notification information; this button after pressed may be replaced with "Resume", and "Edit" which brings up the call notification administration page.

For interactive pager or e-mail notification, only the "last state" of the call (i.e. busy, disconnect, or voice-mail left) may be reported. In addition to the "last state", and as described above, the name and number of the caller as well as the date and time of the event is recorded. If the calling number is blocked or unknown, then "Private" or "Unknown" may appear instead of the calling name and number. For example, for calls which last more than 6 minutes, a notification may be sent indicating that the length of the call is over 6 minutes. This description may be used instead of a description of the last state of the call.

In one embodiment, for each subscriber, an internal database keeps call records. For example, for high call volume subscribers, the last one thousand or so calls may be recorded to the subscriber number. For low call volume subscribers, for example, only about one hundred records may be recorded to the subscriber number. Old call records may be deleted according to a first-in first-out (FIFO) discipline. Call log retrieval functions (through either the web, IVR/VXML interface, pager, or e-mail) are not affected by the number of records stored in the database. The call log displays the final state of the call. The information for each record consists of the name and number of the caller, ("Private" or "Unknown" may appear instead when the calling number is blocked or unknown), the date and time when the call was received, the date and time when the call ended, and the final outcome of call: abandoned, answered, busy, voice-mail, etc. For answered and voice-mail calls, the total time of the call may be appended.

Calls may be ordered according to the date and time when the call was received. For calls that are longer than 6 minutes, for example, a provisional record is created when the call reaches the 6 minute mark. This record is updated later when the call ends. For call log retrieval through the web, a scrollable window with all of the available call records is provided. The following filter controls are available so that the subscriber can narrow the number of records that are displayed (these filters are set to OFF by default): (1) call record extraction by date: From mm/dd/yy at hh to mm/dd/yy at hh; (2) show only numbers (wildcard characters "*" and "?" are allowed); (3) filter-out numbers (wildcard characters "*" and "?" are allowed); and (4) show calls with the following outcome: abandoned, answered, busy, voice-mail, etc.

Subscribers can retrieve call log information by calling a designated number. The subscriber is able to retrieve the call log for "Today", "Yesterday", or for a specific date. The call log information includes the name and number of the caller and the date and time of the call. If there is more than one call from a given number, there is an indication about the number of calls that have been received by this number, and only the date and the time of the last call is reported. In other words the behavior is similar to that of a conventional caller ID box. If the calling number is blocked or unknown, then "Private" or "Unknown" is reported to the caller. To save time during future calls, the subscriber, while listening to the call record, is able to "delete" call records. The deletion of these records only affects the IVR/VXML interface, since the records that reside in the CIDA server 44 are not affected.

In one embodiment, call log information received through an interactive pager or e-mail includes the same information as the call records that are viewed using a web browser, such as the name and number of the caller, the date and time when the call was received, the date and time when the call ended, and the final outcome of call. Records for busy calls only include the date and time when the call was received. Call logs to a pager or e-mail address can be received automatically or can be requested, also, certain filters can be used to narrow the amount of call records that are requested.

While preferred embodiments of the invention have been described in detail, it will be apparent to those skilled in the art that the disclosed embodiments may be modified. Therefore, the foregoing description is to be considered exemplary rather than limiting, and the true scope of the invention is that defined in the following claims.

What is claimed is:

1. A remote call notification system, comprising:
    means for detecting an incoming communication on a communications link to a subscriber's communication device, wherein the means for detecting the communication is in communication with the communication device by the communication link;
    means for monitoring the status of the incoming communication; and intelligent server in communication with means for detecting an incoming communication, the intelligent server originating the remote call notification and automatically initiating a communication of the remote call notification to a remote communications device, the remote call notification comprising (1) a calling number associated with the incoming communication, (2) a name of a calling party associated with the calling number, (3) a first time identifier that provides the time that the incoming communication is first detected, (4) a second time identifier that provides the time that incoming communication is terminated, (5) a length identifier that provides the length of the incoming communication, (6) a date identifier that provides the date that incoming communication is received, (7) a status identifier that provides a real-time status of the incoming communication, (8) a disposition identifier that provides a disposition of the incoming communication, and (9) a priority that indicates the importance of the incoming communication;

a module in communication with the intelligent server operable for monitoring traffic in a communication network of voice-mail platforms that serve a service area of the intelligent server; and interface means for providing an Interactive Voice Response (IVR) and a Voice Extensible Markup Language (VXML) interface for retrieving call log information, wherein the interface means allows the subscriber to check the call log and to request that the call log be sent to a fax number, and wherein the subscriber can erase one or more call log entries on the IVR interface such that the one or more erased call log entries are still available over the Internet via the VXML interface.

2. The system of claim 1, the intelligent server further serving subscriber requests for information of a call log, updating the module, performing administrative functions for the subscriber, returning queries for the call log information with appropriate data, and notifying the subscriber of pertinent call events according to the remote communications device specified by the subscriber.

3. The system of claim 1, further comprising: means for presenting the remote call notification to the remote communications device in a format, wherein the format comprises an audio format, a text format, a short message format, a video format, and a markup language format.

4. The system of claim 1, wherein the remote communications device comprises a wireless telephone, a cellular telephone, a computer, a pager, and a personal digital assistant.

5. The system of claim 1, wherein the remote call notification is communicated through the communications network to an access address associated with the remote communications device using wireless communication signals.

6. The system of claim 1, the status identifier comprising a call state of the communications device, the call state comprising idle, ringing, answered, busy, and disconnected.

7. The system of claim 1, the disposition identifier comprising new, stored, deleted, restored, and forwarded.

8. The system of claim 1, wherein the communications network comprises a celestial communications network and a terrestrial communications network.

9. The system of claim 1, further comprising: means for scrolling through a plurality of the remote call notifications presented on the remote communications device; means for selecting one of the remote call notifications to retrieve a communications message of the incoming communication; and means for presenting the communications message of the incoming message on the remote communications device.

10. A remote call notification method, comprising:
detecting an incoming communication on a communications link to a subscriber's wireless communication device;
creating a remote call notification, the remote call notification comprising (1) a calling number associated with the incoming communication, (2) a name of a calling party associated with the calling number, (3) a first time identifier that provides the time that incoming communication if first detected, (4) a second time identifier that provides the time that the incoming communication, (6) a dated identifier that provides the date that the incoming communication is received, (7) a status identifier that provides a real-time status of the incoming communication, (8) a disposition identifier that provides a disposition of the incoming communication, and (9) a priority identifier that indicates the importance of the incoming communication;
determining an access address associated with a remote communication device;
automatically sending the remote call notification through a communications network to the access address associated with the remote communication device;
presenting the remote call notification to the remote communication device in a format, wherein the format comprises and audio format, a text format, a short message service format, a video format, and a markup formats and
providing an Interactive Voice Response (IVR) and a Voice Extensible Markup Language (VXML) interface for retrieving call log information wherein the interface means allows the subscriber to check the call log and to request that the call log be sent to a fax number, and wherein the subscriber can erase one or more call log entries on the IVR interface such that the one or more erased call log entries are still available over the Internet via the VXML interface.

11. The method of claim 10, wherein the remote communication device comprises a wireless phone, a cellular phone, a computer, a pager, and a personal digital assistant.

12. The method of claim 11, the pager comprises an interactive pager, the interactive pager communicating the remote call notification.

13. The method of claim 10, wherein the remote call notification is communicated through the communications network to the access address associated with the remote communication device using wireless communication signals.

14. The method of claim 10, the status identifier comprising a call state of the communications device, the call state comprising idle, ringing, answered, busy, and disconnected.

15. The method of claim 10, the disposition identifier comprising a description of a disposition of the remote notification, the disposition comprising new, stored, deleted, restored, forwarded, and system administration.

16. The method of claim 10, wherein the communications network comprises a celestial communications network and a terrestrial communications network.

17. The method of claim 10, further comprising: associating the access address with a plurality of communications devices.

18. The method of claim 10, further comprising: scrolling through a plurality of the remote call notifications presented on the remote communication device; selecting one of the remote call notifications to retrieve a communications message of the incoming communication; and presenting the communications message of the incoming message on the remote communication device.

19. The method of claim 10, further comprising: creating a call log associated with the remote call notification; and retrieving the call log; wherein retrieving the call log comprises one of the following: retrieval via a web page, retrieval via wireless, retrieval via Interactive Voice Response (IVR), and retrieval via FAX.

20. The system of claim 1, the means for detecting the incoming communication on the communications link to the subscriber's communication device comprising a wireless terminating trigger used on mobile switching center, the wireless terminating trigger communicating with the mobile switching center to detect the incoming communication to the subscriber's communications device, the subscriber's communications device comprising a wireless communications device.

21. The method of claim 10, the step of detecting the incoming communication on the communications link to the subscriber's communication device further compromising detecting and answered communications link with the subscriber's communication device.

* * * * *